US008966315B2

(12) United States Patent
Burn et al.

(10) Patent No.: US 8,966,315 B2
(45) Date of Patent: *Feb. 24, 2015

(54) SYSTEM-DIRECTED CHECKPOINTING IMPLEMENTATION USING A HYPERVISOR LAYER

(71) Applicant: O'Shantel Software L.L.C., Dover, DE (US)

(72) Inventors: Donald D. Burn, Westborough, MA (US); Jack Justin Stiffler, Marion, MA (US)

(73) Assignee: O'Shantel Software L.L.C., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,415

(22) Filed: Feb. 14, 2013

(65) Prior Publication Data

US 2013/0166951 A1 Jun. 27, 2013

Related U.S. Application Data

(63) Continuation of application No. 12/462,312, filed on Aug. 3, 2009, now Pat. No. 8,381,032.

(60) Provisional application No. 61/086,678, filed on Aug. 6, 2008.

(51) Int. Cl.
*G06F 11/00* (2006.01)
*G06F 11/14* (2006.01)
*G06F 11/20* (2006.01)
*G06F 12/10* (2006.01)

(52) U.S. Cl.
CPC ........ *G06F 11/1446* (2013.01); *G06F 11/1438* (2013.01); *G06F 11/1482* (2013.01); *G06F 11/2017* (2013.01); *G06F 12/1009* (2013.01)
USPC ................. 714/34; 714/35; 714/19; 711/173; 718/1

(58) Field of Classification Search
USPC ................ 714/19, 34, 35, 38; 718/1; 711/173
See application file for complete search history.

(56) References Cited

U.S. PATENT DOCUMENTS

| 4,878,167 A | 10/1989 | Kapulka et al. |
| 5,574,874 A | 11/1996 | Jones et al. |
| 5,956,489 A | 9/1999 | San Andres et al. |
| 6,622,263 B1 * | 9/2003 | Stiffler et al. ................... 714/13 |

(Continued)

*Primary Examiner* — Loan Truong
(74) *Attorney, Agent, or Firm* — Brundidge & Stanger, P.C.

(57) ABSTRACT

While system-directed checkpointing can be implemented in various ways, for example by adding checkpointing support in the memory controller or in the operating system in otherwise standard computers, implementation at the hypervisor level enables the necessary state information to be captured efficiently while providing a number of ancillary advantages over those prior-art methods. This disclosure details procedures for realizing those advantages through relatively minor modifications to normal hypervisor operations. Specifically, by capturing state information in a guest-operating-system-specific manner, any guest operating system can be rolled back independently and resumed without losing either program or input/output (I/O) continuity and without affecting the operation of the other operating systems or their associated applications supported by the same hypervisor. Similarly, by managing I/O queues as described herein, rollback can be accomplished without requiring I/O operations to be repeated and I/O device failures can be circumvented without losing any I/O data in the process.

37 Claims, 5 Drawing Sheets

(56) References Cited

U.S. PATENT DOCUMENTS

| | | |
|---|---|---|
| 7,185,005 B1 | 2/2007 | Long et al. |
| 7,216,254 B1 | 5/2007 | Rajan et al. |
| 7,231,554 B2 | 6/2007 | Moser et al. |
| 7,418,630 B1 * | 8/2008 | Vick et al. ............... 714/34 |
| 7,529,897 B1 * | 5/2009 | Waldspurger et al. ....... 711/162 |
| 7,853,825 B2 | 12/2010 | Varadarajan et al. |
| 7,865,893 B1 * | 1/2011 | Omelyanchuk et al. ......... 718/1 |
| 7,962,909 B1 | 6/2011 | Klaiber |
| 8,127,174 B1 * | 2/2012 | Shah et al. ............... 714/13 |
| 8,214,686 B2 * | 7/2012 | Ueda ............... 714/15 |
| 8,510,757 B2 * | 8/2013 | Subhraveti ............... 719/320 |
| 2003/0005265 A1 * | 1/2003 | Barowski et al. ........... 712/218 |
| 2004/0003324 A1 | 1/2004 | Uhlig et al. |
| 2005/0160423 A1 * | 7/2005 | Bantz et al. ............... 718/1 |
| 2005/0198239 A1 | 9/2005 | Hughes |
| 2006/0085679 A1 * | 4/2006 | Neary et al. ............... 714/13 |
| 2006/0150010 A1 | 7/2006 | Stiffler et al. |
| 2006/0294435 A1 * | 12/2006 | Vick et al. ............... 714/38 |
| 2007/0005919 A1 | 1/2007 | Van Riel |
| 2007/0028144 A1 * | 2/2007 | Graham et al. ............... 714/34 |
| 2008/0155223 A1 | 6/2008 | Hiltgen et al. |
| 2008/0294937 A1 | 11/2008 | Ueda |
| 2008/0301101 A1 | 12/2008 | Baratto et al. |
| 2008/0320594 A1 * | 12/2008 | Jiang ............... 726/24 |
| 2009/0007105 A1 | 1/2009 | Fries et al. |
| 2009/0037936 A1 * | 2/2009 | Serebrin ............... 719/318 |
| 2009/0113423 A1 * | 4/2009 | Hiltgen et al. ............... 718/1 |
| 2009/0217021 A1 * | 8/2009 | Goodson et al. ............... 713/1 |
| 2009/0248611 A1 * | 10/2009 | Xu et al. ............... 707/1 |
| 2009/0249049 A1 | 10/2009 | Weissman et al. |
| 2011/0113208 A1 * | 5/2011 | Jouppi et al. ............... 711/162 |

* cited by examiner

SYSTEM-DIRECTED CHECKPOINTING IMPLEMENTATION USING A HYPERVISOR LAYER

RELATED APPLICATIONS

This application is a continuation application of U.S. application Ser. No. 12/462,312, filed Aug. 3, 2009, which is related to, and claims priority of, U.S. provisional application No. 61/086,678 filed on Aug. 6, 2008, by Donald Burn and Jack J. Stiffler.

FIELD OF THE INVENTION

This invention relates to software techniques and procedures for achieving fault tolerance in computer systems and, more particularly, to techniques and procedures for establishing and recording a consistent system state from which all running operating systems and applications can be safely resumed following a fault.

BACKGROUND OF THE INVENTION

"Checkpointing" has long been used as a method for achieving fault tolerance in computer systems. It is a procedure for establishing and recording a consistent system state from which all running applications can be safely resumed following a fault. In particular, in order to checkpoint a system, the complete state of the system, that is, the contents of all processor and input/output (I/O) registers, cache memories, and main memory at a specific instance in time, is periodically recorded to form a series of checkpointed states. When a fault is detected, the system, possibly after first diagnosing the cause of the fault and circumventing any malfunctioning component, is returned to the last checkpointed state by restoring the contents of all registers, caches and main memory from the values stored during the last checkpoint. The system then resumes normal operation. If inputs and outputs (I/Os) to and from the computer are correctly handled, and if, in particular, the communication protocols being supported provide appropriate protection against momentary interruptions, this resumption from the last checkpointed state can be effected with no loss of data or program continuity. In most cases, the resumption is completely transparently to users of the computer.

Checkpointing has been accomplished in commercial computers at two different levels. Early checkpoint-based fault-tolerant computers relied on application-directed checkpointing. In this technique, one or more backup computers were designated for each running application. The application was then designed, or modified, to send periodically to its backup computer, all state information that would be needed to resume the application should the computer on which it was currently running fail in some way before the application was able to establish the next checkpoint.

This type of checkpointing could be accomplished without any specialized hardware, but required that all recoverable applications be specially designed to support this feature, since most applications would normally not write the appropriate information to a backup computer. This special design placed a severe burden on the application programmer not only to ensure that checkpoints were regularly established, but also to recognize what information had to be sent to the backup computer. Therefore, in general, application-directed checkpointing has been used only for those programs that have been deemed especially critical and therefore worth the significantly greater effort required to program them to support checkpointing.

System-directed checkpointing has also been implemented in commercial computer systems. The term "system-directed" refers to the fact that checkpointing is accomplished entirely at the system software level and applications do not have to be modified in any way to take advantage of the fault-recovery capability offered through checkpointing. System-directed checkpointing has the distinct advantage of alleviating the application programmer from all responsibility for establishing checkpoints. System-directed checkpointing involves periodically establishing checkpoints in which the system state at that instant is recorded in such a way that, should a fault occur before reaching the next checkpoint, the system can be rolled back and the state that prevailed at the last checkpoint can be restored. Either of two basic methods is used to accomplish this. The first, called pre-image checkpointing, requires the contents of any page in memory to be copied to a checkpoint buffer before that page is allowed to be modified. The second, called post-image checkpointing, depends on the existence of a shadow memory with a shadow page for each page in main memory. On this case, when an attempt is made to write to a page in main memory, its address is captured and placed on an address queue. Following each checkpoint, all modified pages are copied into a shadow buffer and from there into the shadow memory.

While system-directed checkpointing has obvious advantages over application-directed checkpointing, its implementation has traditionally been accomplished through the use customized hardware and software, making it virtually impossible for such systems to remain competitive in an era of rapidly advancing state-of-the-art commodity computers and operating systems.

More recently, techniques have been disclosed for achieving system-directed checkpointing on standard computer platforms. These techniques, however, all require either modified hardware or else modifications to the operating system kennel. The first of these techniques involves modifying the hardware to capture the information needed to establish a checkpoint. This procedure is best implemented in the memory controller hardware, but unfortunately, standard memory controllers do not support the required functionality. The second technique entails modifying the operating system kernel to enable certain memory writes to be interrupted momentarily so that either the pre-image of the addressed section of memory, or the address itself, can be captured and recorded elsewhere in memory. The problem with this approach is that it can be implemented only on systems having operating systems that have been so modified.

SUMMARY OF THE INVENTION

A procedure is described for endowing otherwise standard computers with a high level of fault tolerance at a very modest incremental cost, without requiring either the hardware or the operating system kernel to be modified in any way. This procedure is implemented through the addition of a virtual operating system layer, called the "virtual layer", the "virtual machine monitor" or the "hypervisor", that sits between any standard operating system, called the "guest operating system", and the computer hardware. Hypervisor layers have become increasingly prevalent in data centers and even in desktop computers because of the advantages they afford in system management, operating environment versatility and computer resource allocation. Conceptually, the hypervisor is a specialized operating system, but instead of hosting user applications, it serves as the host to other operating systems, which, in turn, host user applications. State-of-the-art processors provide support for hypervisor systems by, in effect, implementing three levels of operation, an application level, an operating system level and a hypervisor level. Each guest operating system controls a virtual computer and allocates that computer's resources in the normal way. But any attempt to allocate the computer's physical, as opposed to virtual, resources, results in a trap to the hypervisor. The hypervisor, in response to such a trap performs the operation on behalf of the host operating system, but, depending on the specific operation and on the circumstances under which it is attempted, it may, in accordance within the present invention, extend the operation so as to support checkpointing and other fault tolerant features.

When the hypervisor is implemented as detailed herein and used in conjunction with the checkpointing and rollback procedures described in U.S. Pat. No. 6,622,263, standard computers can be rendered fault tolerant without requiring any of the hardware or software customizations normally associated with fault-tolerant computers. All applications, host operating systems and input/output subsystems receive the benefit of fault tolerance without having to be modified in any way.

BRIEF DESCRIPTION OF THE DRAWINGS

The above and further advantages of the invention may be better understood by referring to the following description in conjunction with the accompanying drawings in which.

DETAILED DESCRIPTION

A hypervisor-based computer system is described that periodically captures and checkpoints relevant system-state information and, when used in concert with the checkpointing and fault-recovery procedures described in U.S. Pat. No. 6,622,263, can convert any standard computer running any standard operating system into a fault-tolerant computer. This state information is naturally segregated on a per-guest-operating-system basis and can be captured separately for each guest OS or captured simultaneously for the entire system as a whole. In the latter case, if the hypervisor also checkpoints its own state, the entire system can be rolled back, affording protection against faults encountered in running hypervisor code as well as those encountered by any of the guest operating systems. Used in this way, the methodology described in U.S. Pat. No. 6,622,263 covers hypervisor implementations in an obvious way, with the term "operating system" used in that disclosure replaced by "hypervisor" and the term "application" replaced by "guest operating system". Consequently, the present invention focuses on the case in which each guest operating system is checkpointed independently of all the others and, following a fault, is rolled back to its last checkpoint and restarted without impacting those other guest operating systems. In this case, the state of the hypervisor itself is not checkpointed so no attempt is made to recover should the hypervisor encounter a bug in its own code. However, it should be obvious to anyone reasonably versed in the state of the art that both methods can be implemented simultaneously, giving the hypervisor the option recovering from a fault either by rolling back a single guest OS or, should that fail or the fault appear to be global in nature, by rolling back the entire system.

Hypervisor modifications that support fault tolerance can be segregated into three basic components:

1. Memory management subsystem—responsible for managing physical memory and tracking modifications to it and for segregating it into partitions, some for use by guest operating systems and some for its own use.

2. Device emulator subsystem—responsible for managing virtual input/output (I/O) device emulators. The emulators present generic I/O devices to the guest operating systems. In many hypervisor implementations, these emulators are integrated into a virtual I/O processor (VIOP).

3. Checkpointing and recovery subsystem—implements the checkpoint and recovery operations required for fault tolerance.

1) Memory Management Subsystem

The memory manager is the key hypervisor component for providing checkpointing support. Its primary function is to allocate physical memory not only to itself but also to the potentially multiple operating systems being hosted on the same computer. It presents to each guest operating system a block of memory that appears to be physically contiguous although it may in fact be composed of an arbitrary set of pages located anywhere in physical memory.

As with all operating systems, the translation from virtual addresses to physical memory addresses is accomplished using a set of page tables. Hypervisor memory-manager subsystems, however, also manage, in addition to the normal physical page tables, a set of pseudo-physical page tables, here called the guest page tables, for each guest operating system. These page tables give the guest operating system the illusion that it is managing physical memory, but they are mapped into memory as read-only so that any modification to them can be reflected in the physical page tables managed by the hypervisor itself. The hypervisor memory manager also maintains a page database, including information about the user of that page (guest operating system, I/O subsystem, etc.), whether the page is read-only, and, if the processor supports multiple page sizes, the size of the page and its decomposition into a set of smaller physical pages.

Figure 1:
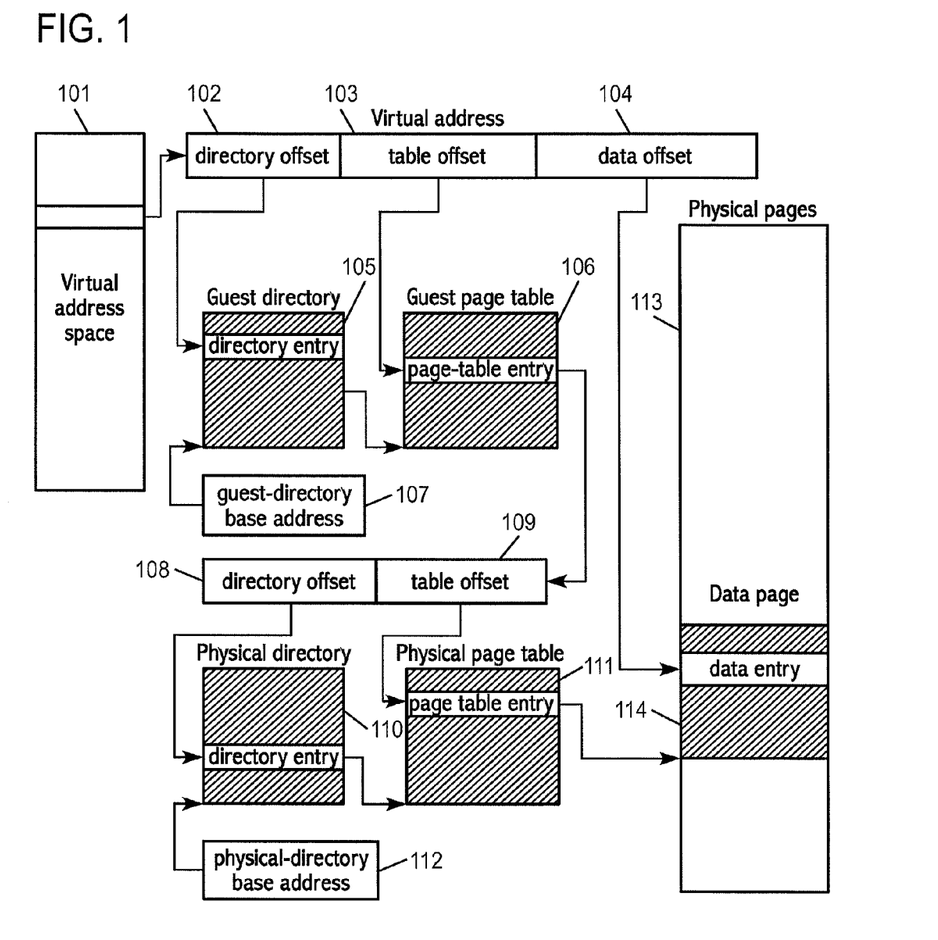
FIG. 1 is a block schematic diagram of a generic memory-mapping scheme showing the mapping from the guest operating system's virtual addresses to its pseudo-physical addresses and from those addresses to actual physical addresses.

An illustrative mapping from a virtual address used by an application to an address in physical memory is shown in FIG. 1. The virtual address space 101 consists of a linear array of addresses used by each application to access physical memory and memory-mapped I/O locations. Each virtual address in that space is partitioned into several segments used to access successive levels in the virtual-to-physical mapping hierarchy. FIG. 1 shows a two-level map for translating virtual addresses into pseudo-physical page addresses combined with a second two-level map for translating pseudo-physical addresses into physical page addresses, but more or fewer levels may be used in an obvious extension of the mapping described here. The term "pseudo-physical address" is used here to denote the address into which the guest operating system maps the virtual address on question. (The term "guest address space" will be used to denote the pseudo-physical address space associated with a specific guest operating system.)

The first segment of the virtual address (102) is a directory offset or pointer to a word stored in guest directory 105; the directory is a page stored in pseudo-physical memory at a location identified by the guest-directory base address 107, which is loaded at by the guest operating system into a processor register dedicated to that purpose. This word is in turn the address of a second page, the guest page table 103, also stored in pseudo-physical memory. The second segment of the virtual address (103) is a table offset that points to a word in that table called here the virtual or pseudo-physical address. In the absence of a hypervisor, the pseudo-physical address reached at this point would serve as the actual physical address of a page in physical memory. Instead, it is converted by the hypervisor into a true physical address using a second set of translation tables. Segment 108 of the pseudo-physical address is a directory offset that points to a word in a directory in physical memory pointed to by the physical-directory base address register 112. This dedicated processor register is loaded by the hypervisor and is unique to each guest operating system. As before, the word thereby extracted from the directory is the address of a physical page table 111; the second segment (109) of the pseudo-physical address is a table offset that identifies the word in the page table containing the address of the desired page (114) in physical memory. The last segment of the virtual address (104) is a data offset that points to the data entry of interest. Note that if the guest directories and page tables have not previously been loaded into the processor's cache, they must be read from physical memory. The pseudo-physical addresses of those pages must therefore also be translated by hypervisor maps info physical addresses as previously described.

The maps used to translate pseudo-physical to physical addresses reside in hypervisor space and are mapped into the hypervisor's virtual address space using still other page maps. Of will be noted that the pseudo-physical address does not use the full address width since the lower-order address bits are taken directly from the guest's virtual address; the remaining bits are used for, example, to identify read-only pages. The specific use of these bits is implementation dependent, but all implementations leave some of these bits undefined. One of these undefined bits is used in the present invention as described below.

The major modification to the hypervisor's memory-management subsystem required to support checkpointing-is the implementation of an extension of the technique, described in U.S. Pat. No. 6,622,263, for ensuring that memory can be restored to its pre-rollback state following a fault. This involves the allocation of a bit, called a temporary-read-only bit, in each physical page address. This bit is set by the memory manager in each entry in the relevant directory whenever an operating system is invoked and again following the establishment of each operating system checkpoint. Any attempt to write to an address with the temporary-read-only bit set causes a trap to the memory manager. On response to such a trap, the memory manager first determines if the page being accessed is indeed read-only. If it is, the memory manager invokes the relevant page-fault handler. Of it is not read-only, the memory manager resets the temporary-read-only bit in the directory address in question, accesses the page table corresponding to that address and sets the temporary-read-only bit in each of its addresses except for the address of the data page being accessed. It then records the address of that page on a guest-OS-specific checkpoint address queue and, in the case of pre-image checkpointing, copies the page itself to a guest-OS-specific checkpoint data buffer.

Optionally, temporary-read-only bit can also be used in the hypervisor's own virtual-to-physical map pages to enable the hypervisor to checkpoint its own state using the methodology described in U.S. Pat. No. 6,622,263. In this case, if a fault occurs in a guest OS context, the hypervisor rolls back the guest OS as described in the present invention. Of that should fail to correct the problem, or if a fault is encountered while the hypervisor itself is running, it then has the option of rolling back the entire system.

2) Device Emulator Subsystem

The I/O subsystem in many hypervisors is implemented using virtual I/O processors (VIOPs). Preferably, the hypervisor is also capable of supporting dual VIOPs with each having interfaces to the same dual-ported controllers. This enables one VIOP to serve as a backup should the active VIOP sustain a non-recoverable fault (e.g., one of its attached physical controllers fails). Regardless of the specific I/O subsystem implementation, the hypervisor provides the guest operating systems with generic interfaces to each class of I/O device (e.g., disk, network, serial bus, parallel bus, display, etc.). Relatively minor modifications of these interfaces enable I/O operations to be handled correctly following a fault-induced rollback of the guest operating system that issued them. One of the major innovations of the invention is a means for preserving I/O buffers set up since the last checkpoint so that they can continue to be used following a fault. This makes it possible to recover from faults without having to restart in-process I/O operations after the system state has been rolled back to its last checkpointed state and without the need for separate physical I/O processors or specially modified I/O drivers.

To make this possible, each of the I/O subsystem's device emulators establishes read- or write-buffers as the destination or source, respectively, of the data to be read from or written to the I/O device in question. On addition, it defines an I/O-request block that it places on a list of pending I/O requests (the "pending-I/O" list). Of the emulator serves as the interface to more than one physical device, it maintains separate lists for each such device. Two additional lists are maintained for each guest OS, one list for operations completed for that guest OS (the "completed-I/O" list) and one for operations the completion of which was acknowledged at the time of the last checkpoint (the "acknowledged-I/O" list). Finally, it also maintains a list of states associated with each device it emulates (the "device-state" list). There are various well-known procedures for managing such lists. For illustrative purposes, it will be assumed that the lists are structured as linked lists, with each item on the list containing the address of the previous item on the list, or an indication that it is at the head of the list, and the address of the next item on the list, or an indication that it is the last such item. (Device-specific pointers are used to indicate the addresses of the first and last items on the pending-I/O and device-state lists. Global pointers, accessible by all emulators, are used for the addresses of the last items on each guest OS's completed-I/O list.

Each request block on the pending-I/O list contains the identification of the requestor as well as the details of request as extracted from the information submitted by the requestor, including the physical start address and the length of any buffer established for the I/O in the requestor's space. It also contains a pointer to the item on the device-state list indicating the state of the device of interest at the time the request was submitted.

Figure 2:
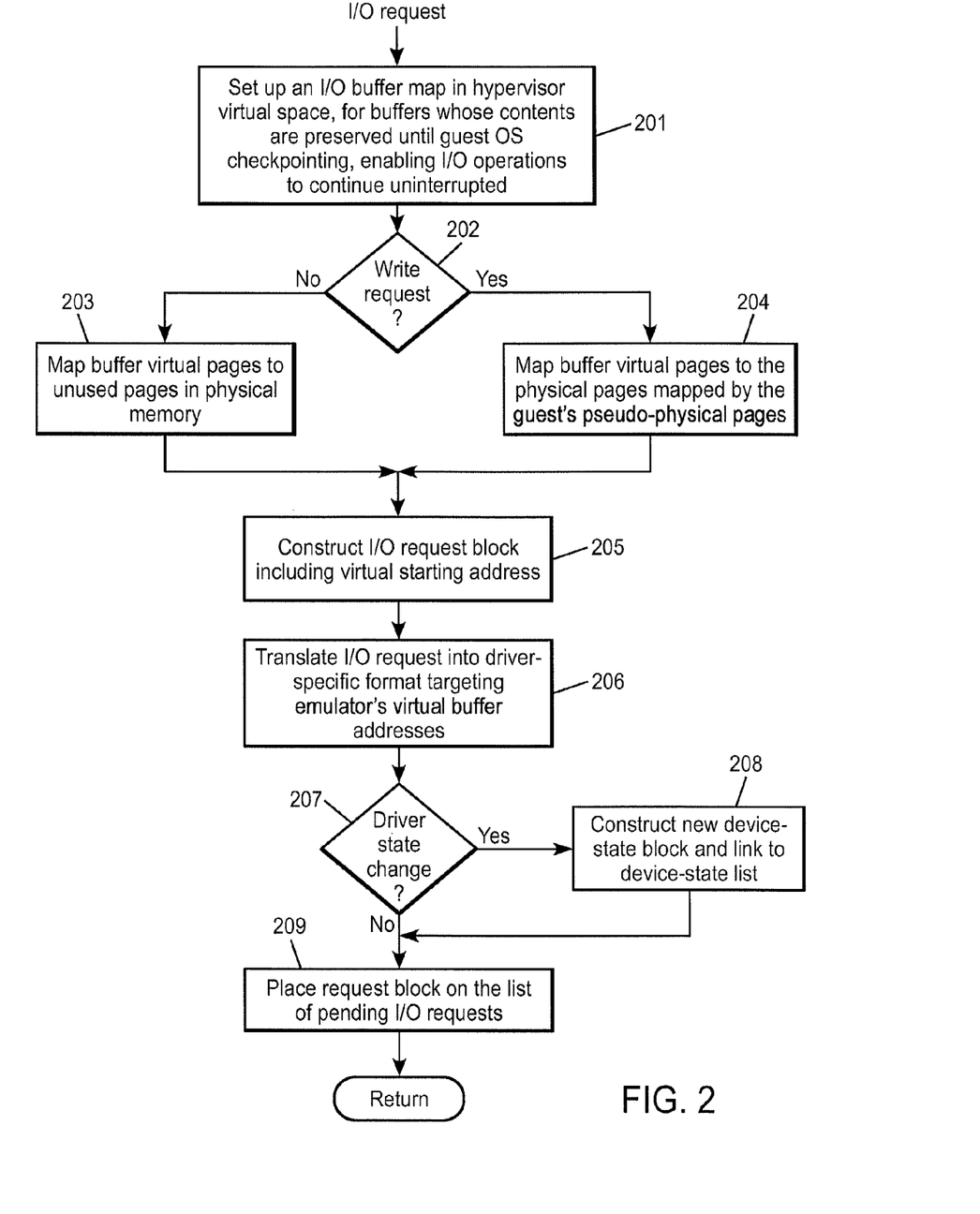
FIG. 2 is a flowchart of the hypervisor's response to a request from a guest operating system for an I/O operation.

FIG. 2 is a flowchart showing the hypervisor's response to a request to write data to, or to read data from, an I/O device. Regardless of whether the request is for a read or a write, the hypervisor sets up a buffer of the appropriate length in its own virtual address space (step 201). Of the operation is for data to be read from an I/O device (202), the hypervisor defines a page map linking those virtual addresses to available physical addresses (203). If it is a write to an I/O device, the requestor has already generated the source data so the hypervisor defines a page map linking its buffer virtual addresses to the physical addresses containing the data (204). (The temporary-read-only bits in the hypervisor page maps are not set unless the state of the hypervisor itself is to be checkpointed.) If an attempt is made to write into one of the data pages reached through the guest's map for the first time since the last checkpoint (i.e., if some part of the page not actually part of the data buffer is written to for the first time) that page will be checkpointed in the normal way.

After setting up the buffer, the hypervisor constructs the aforementioned request block (205) appending to it the starting virtual address of those buffers. It translates the I/O request into the appropriate driver-specific format using its own virtual addresses to define the source or destination of the data (203). Of the I/O command entails a driver state change (207), the emulator reflects that fact in a device-state block, links it to the device-state list and updates the end-of-list pointer (208). This status information is used to reestablish the driver's state should it be necessary to restart it, or a backup driver, following an I/O fault. The hypervisor then links the request block to the list of pending-I/O requests (209).

While it is possible to release I/O requests between checkpoints and rely on higher-level communication protocols to accommodate the possibility that certain I/O events will need to be repeated or that others may be unexpectedly repeated, the higher checkpoint frequencies now practicable with state-of-the-art computer systems make it acceptable to delay releasing I/O requests until the next checkpoint takes place. Doing so relieves the higher-level protocols from having to account for such events. (Higher-level protocols must still be used, however, to resolve such ambiguities when an I/O-device or other failure causes pending I/Os to be resubmitted to a backup device either locally or on a remotely located computer.) Accordingly, step 209 stipulates placing the request block on the pending-I/O queue for that device, but delaying the release of the request until the next checkpoint. Similarly, when the requested I/O operation has been completed, the request block is moved to the completed-I/O list and the acknowledgement of that completion is passed on to the requesting guest at the time of the immediately following checkpoint. It should be noted, however, that disk read and write requests need not be synchronized with checkpoints. The technique described in U.S. Pat. No. 6,622,263 whereby disk access requests can be issued without waiting for a checkpoint is equally compatible with the current invention.

Figure 3:
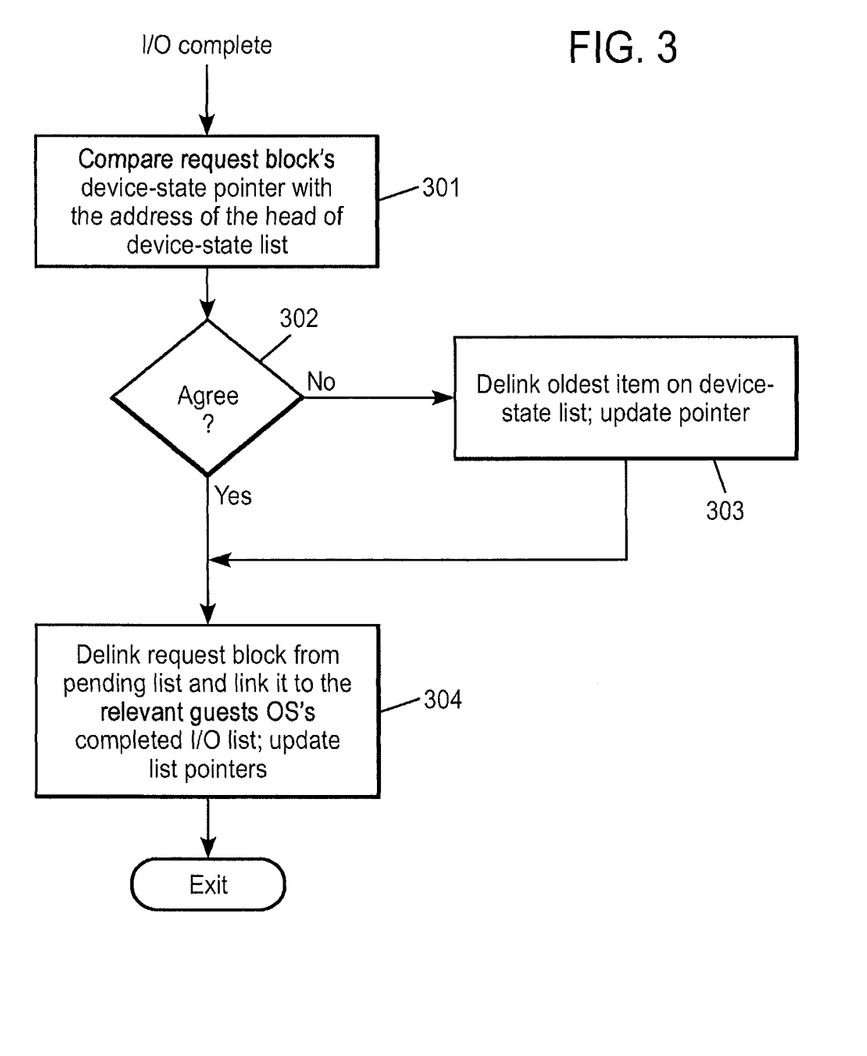
FIG. 3 is a flowchart of the hypervisor's response to a request-complete message from an I/O device.

The emulator's response to a message from the physical device indicating that a requested I/O has been completed is shown in FIG. 3. It first compares the device-state address in the request block with the address of the head of the device-state list (301). If they agree (302), the device state recorded in the device-state block at the head of the list is the state that prevailed following the execution of the request. If they do not, the execution of the request changed the state of the device, so the oldest state on the list is no longer relevant. Accordingly, the oldest item on the list is delinked (303) and the pointer to the head of the list updated. The emulator then delinks the request block from its list of pending I/Os and links it to the completed-I/O list of the guest OS that generated the request (304).

3) Checkpointing and Recovery Subsystem

Figure 4:
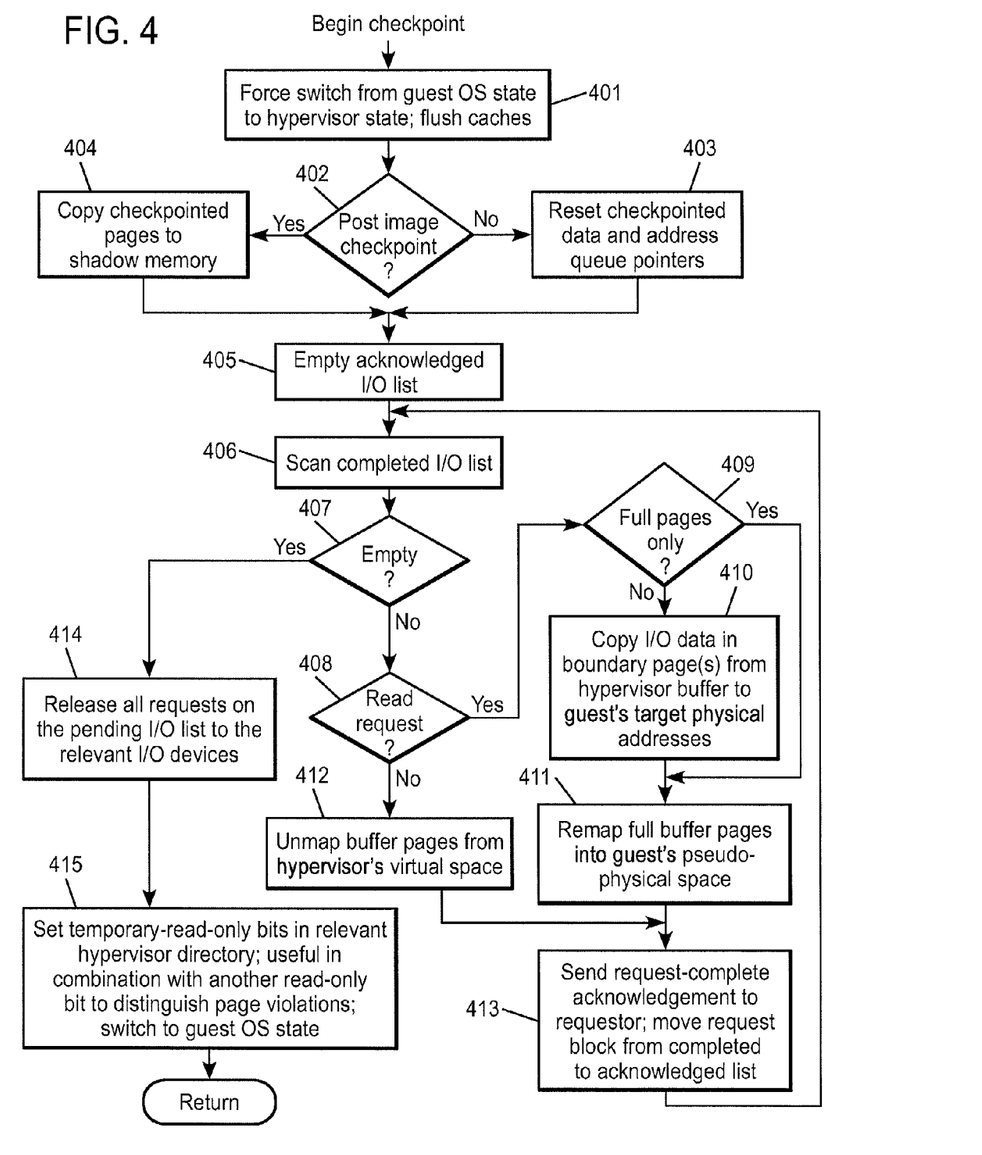
FIG. 4 is a flowchart illustrating the process by which the hypervisor effects a checkpoint and preserves I/O integrity.

FIG. 4 shows a flowchart illustrating the checkpointing procedure. The first step in the procedure (step 401) is for the hypervisor to force a context switch through which all processors running the guest OS to be checkpointed switch to the hypervisor state. The mechanism for doing this is implementation dependent but typically involves an interrupt or trap that is recognized by the relevant processors. The trigger for forcing this context switch is usually determined by the elapsed time since the last checkpoint, but other triggers, such as blockage on certain I/O events can be used in addition to the normal time-based triggers. Following the context switch, during which the internal state of each affected processor is dumped on the relevant process queue, all modified cache blocks are either flushed out to main memory or otherwise captured (see below).

Depending on whether pre- or post-image checkpointing is used (402), the hypervisor then either simply resets the pointers into the checkpoint address and pre-image data page queues (403) or else copies the pages identified by the checkpointed addresses into shadow memory (404). As demonstrated in U.S. Pat. No. 6,622,263, this copying can optionally be done in background mode after normal processing resumes. If post-image checkpointing is being implemented, the processor caches do not need to be flushed if the processor implements any of the standard cache-coherency protocols that ensure that the most recently modified cache line is always sourced whenever it is accessed, regardless of where it physically resides. On this case, when each modified page is copied to shadow memory, any modified cache line in that page will be copied, even if it has not yet been moved back to main memory. Again depending on the specific processor implementation, it may be necessary to invalidate, or at least set the temporary-read-only bits, in the processor-resident virtual-to-physical address-translation buffers, usually called the translation-look-aside buffers (TLBs), at each checkpoint. This ensures that the first attempt to write to a page following the checkpoint will still result in the previously described trap even if that same page had an entry in the TLB prior to that checkpoint.

Once the guest OS's state has thus been checkpointed, the hypervisor discards the list of acknowledged I/O operations (405) since the fact that these operations have been completed is now part of the guest's checkpointed state. It then sets up the environment needed to return the context to that of the guest operating system. This guest OS may or may not be given the same processing resources that it had when it was checkpointed, however, since the hypervisor can reallocate resources whenever the occasion demands.

To set up the environment, the hypervisor scans the completed-I/O list associated with the guest OS to be invoked (406) and, if there are any request blocks on that list (407), examines the first such request (408). If it is a read request, the hypervisor then determines if the request involves any partially used pages (409). If it does, it copies the portions of those pages that correspond to the buffered data from the hypervisor's buffer pages to the corresponding locations in the guest's read buffer (410). Optionally, the hypervisor can copy the non-buffer portion of the corresponding guest page into the hypervisor's buffer page and then remap that page as the new guest page. This may represent a small performance improvement if the data buffer contents of the page in question exceed half the size of the page. On any case, the hypervisor then remaps all full buffer pages from its own space into the guest's space (411), thereby effectively filling the guest's read buffer with the requested information.

If the request was for a write operation, the hypervisor simply unmaps the source pages from its own space (412), freeing up those virtual addresses for other uses. The source pages remain mapped into the guest OS's space.

For both read and write operations, following the remapping of the data buffers, the hypervisor informs the requesting OS that the operation has been completed and moves the request block from the completed-I/O lost to the acknowledged-I/O list (413). This latter list is retained until the next checkpoint since the guest OS will have to be informed of the fact that the operation has been completed should it be roiled back before that information is part of its checkpointed state. The method for acknowledging the completion of the operation to the guest OS is implementation and device dependent, but typically involves an interrupt or trap directed to the guest OS.

Once all I/O operations that were completed prior to the last checkpoint have been dealt with, the hypervisor releases all pending I/O requests (i.e., all those I/O requests generated since the last checkpoint) to the relevant device emulators (414), sets the temporary-read-only bits in the guest's page directory and institutes a context switch back the guest OS (415).

Figure 5:
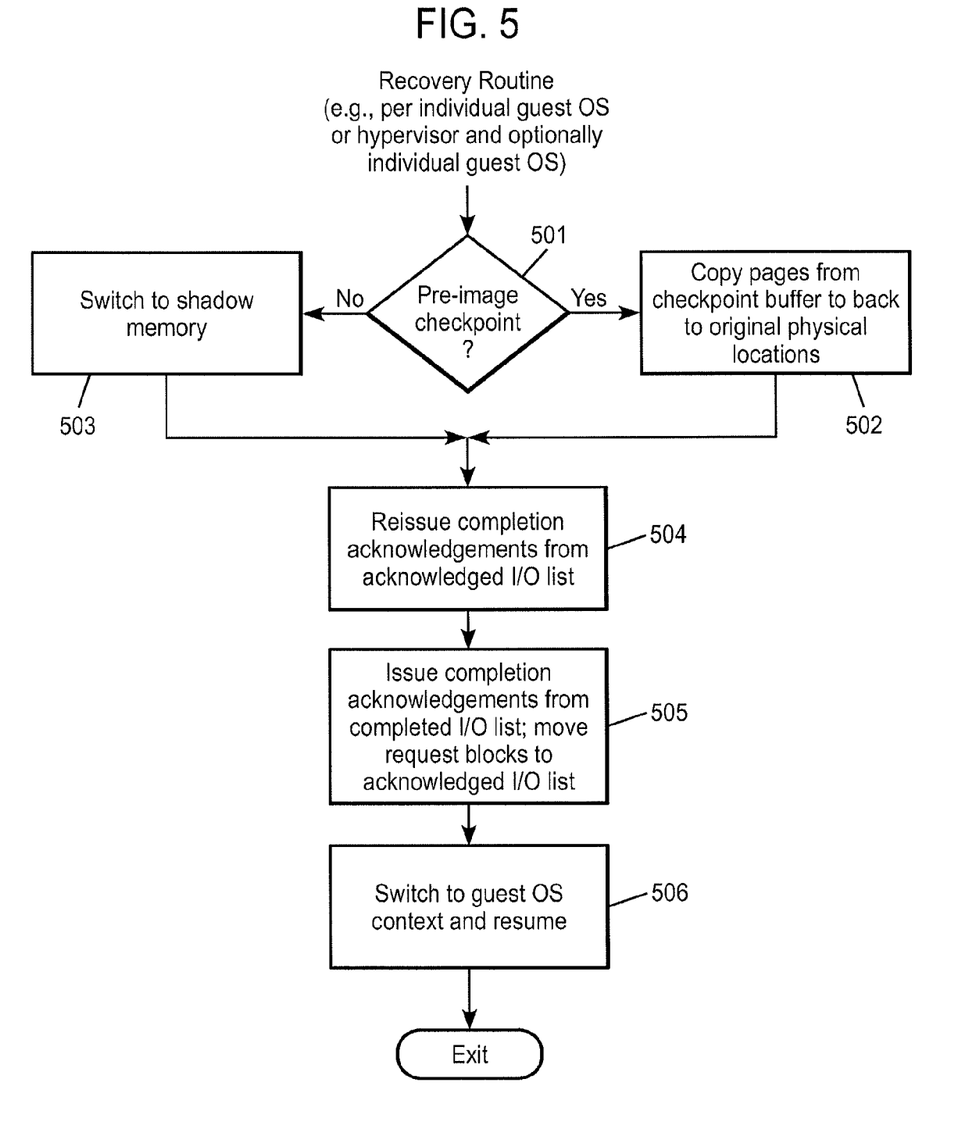
FIG. 5 is a flowchart showing the procedure for implementing a rollback following a fault.

The recovery procedure following a fault is shown in FIG. 5. If pre-image checkpointing is being implemented (501), the hypervisor copies the checkpointed memory pages from checkpoint memory back to the locations indicated by the checkpointed addresses (502). If post-image checkpointing is used instead, it switches to the shadow memory (503). Depending on the specifics of the checkpointing scheme being implemented, it may simply remap the guest OS's pages to their shadow locations or, in the case of remote checkpointing, it may reallocate all resources associated with the guest OS to the backup computer. Also, depending on the implementation and the nature of the fault, it may reestablish the abandoned pages in the primary memory as the new shadow memory.

After thus returning the guest OS back to its last checkpointed state, the hypervisor then relays acknowledgements for all I/O operations that were completed at the time of that checkpoint (504) and those that have been completed since that time (505). The latter acknowledgements are then moved to the acknowledged I/O list. At this point, the guest OS is ready to resume operation (503).

If an I/O device fails, the device emulator resets that device to the state listed in the block at the head of the device-state list, thereby returning it to the state that prevailed at the time the request at the head of its pending-I/O request list was submitted. If then resubmits that request, and, in turn, the rest of the requests on the pending-I/O queue, if the device in question has a backup, either locally or, if remote checkpointing is being used, on some other computer (e.g., if the hypervisor supports dual VIOPs), the I/O operations can be restarted on the backup device. If the device is located on a different computer from the one running the guest OS in question, the device-state and pending-I/O request queues must also be sent to the backup computer whenever a new I/O request is submitted by that guest OS.

These same modifications also make it possible to recover from a fault in the VIOP itself, either by restarting the VIOP (assuming the fault does not permanently disable an attached controller) or by switching to the dual VIOP and, in either event, returning the device emulators to the appropriate state as before and reissuing all pending I/O requests. In this case, higher-level protocols must be relied upon to cope with possibly repeated requests.

As previously noted, the invention disclosed here is compatible with that disclosed in U.S. Pat. No. 6,622,263 enabling the hypervisor itself also to be checkpointed. If this is done and the entire system, as opposed to a single guest OS, is rolled back, some I/O operations may be interrupted and will have to be restarted as described in that disclosure.

The invention claimed is:

1. A computer system configured to run a hypervisor operable to enable a state of one or more guest operating systems to be checkpointed comprising:
    a processor;
    a memory-manage subsystem configured to maintain and use a temporary-read-only bit in tables used to convert pseudo-physical addresses of a hypervisor's guest operating system (OS) to physical addresses, and to use the temporary-read-only bit in conjunction with another read-only bit to trigger a trap by which normal read-only page violations and violations for checkpointing are distinguishable by the hypervisor; and
    a rollback and recovery subsystem configured to periodically checkpoint the state of one or more guest OS's of the hypervisor.

2. The system of claim 1, wherein the memory-management subsystem is further configured to maintain the temporary-read-only bit in directory addresses and page maps used to convert the guest OS's pseudo-physical addresses to the physical addresses.

3. The system of claim 1, further comprising a device-emulator subsystem configured to maintain input/output (I/O) read-and write-buffers in the hypervisor's virtual space, whose contents are preserved until the guest OS is checkpointed following completion of an I/O operation;
    wherein the input/output (I/O) read-and write-buffers maintained in the hypervisor's virtual space are used for all I/O operations, and wherein preserving the contents until the guest OS is checkpointed following the completion of the I/O operation enables I/O operations to continue uninterrupted using standard, unmodified I/O drivers.

4. The system of claim 3, wherein the device-emulator subsystem is configured to manage three lists of input/output (I/O) request blocks for the guest OS comprising:
    a list of those requests that have been made by the guest OS but have not yet been completed;
    a list of those requests that have been completed since the guest OS was last checkpointed; and
    a list of those requests that were acknowledged to the guest OS as having been completed at the time of its last checkpoint.

5. The system of claim 1, wherein the rollback and recovery subsystem is so configured that any guest OS is rolled back to its last checkpointed state, independently of all other guest OS's running on the same computer system.

6. The system of claim 1, wherein the rollback and recovery subsystem is so configured that ongoing I/O operations are not interrupted in the event of a fault and need not be repeated following any such rollback.

7. The system of claim 1, in which the hypervisor itself is checkpointed and rolled back, while still providing the option of rolling back the one or more guest OS's individually.

8. A method comprising:
    maintaining and using a temporary-read-only bit in tables used to convert pseudo-physical addresses of a hypervisor's guest operating system (OS) to physical addresses;
    triggering a trap using the temporary-read-only bit in conjunction with another read-only bit by which normal read-only page violations and violations for checkpointing are distinguishable by the hypervisor; and
    periodically checkpointing a state of one or more guest OS's of the hypervisor.

9. The method of claim 8, wherein the maintaining of the temporary-read-only bit includes maintaining the temporary-read-only bit in directory addresses and page maps used to convert the guest OS's pseudo-physical addresses to the physical addresses.

10. The method of claim 8, further comprising:
maintaining input/output (I/O) read-and write-buffers in the hypervisor's virtual space, whose contents are preserved until the guest OS is checkpointed following completion of an I/O operation; and
preserving the contents until the guest OS is checkpointed following completion of the I/O operation.

11. The method of claim 10, wherein the maintaining of the I/O read-and write-buffers includes managing three lists of input/output (I/O) request blocks for the guest OS, the lists comprising:
a list of those requests that have been made by the guest OS but have not yet been completed;
a list of those requests that have been completed since the guest OS was last checkpointed; and
a list of those requests that were acknowledged to the guest OS as having been completed at the time of its last checkpoint.

12. The method of claim 8, wherein the checkpointing of the state of the one or more guest OS's permits that any guest OS is rolled back to its last checkpointed state, independently of all other guest OS's running on a same computer system.

13. The method of claim 8, further comprising checkpointing and rolling back the hypervisor, while still providing the option of rolling back the one or more guest OS's individually.

14. A non-transitory computer-readable medium having computer-executable instructions stored thereon that, if executed by a computing device, cause the computing device to perform operations comprising:
maintaining and using a temporary-read-only bit in tables used to convert pseudo-physical addresses of a hypervisor's guest operating system (OS) to physical addresses;
triggering a trap using the temporary-read-only bit in conjunction with another read-only bit by which normal read-only page violations and violations for checkpointing are distinguishable by the hypervisor; and
periodically checkpointing a state of one or more guest OS's of the hypervisor.

15. The non-transitory computer-readable medium of claim 14, in which the maintaining of the temporary-read-only bit includes maintaining the temporary-read-only bit in directory addresses and page maps used to convert the guest OS's pseudo-physical addresses to the physical addresses.

16. The non-transitory computer-readable medium of claim 14, wherein the operations further comprise:
maintaining input/output (I/O) read-and write-buffers in the hypervisor's virtual space, whose contents are preserved until the guest OS is checkpointed following completion of an I/O operation; and
preserving the contents until the guest OS is checkpointed following completion of the I/O operation.

17. The non-transitory computer-readable medium of claim 16, wherein the operations further comprise continuing I/O operations uninterrupted using standard, unmodified I/O drivers.

18. The non-transitory computer-readable medium of claim 16, wherein the maintaining of the I/O read-and write-buffers includes managing three lists of input/output (I/O) request blocks for the guest OS, the lists comprising:
a list of those requests that have been made by the guest OS but have not yet been completed;
a list of those requests that have been completed since the guest OS was last checkpointed; and
a list of those requests that were acknowledged to the guest OS as having been completed at the time of its last checkpoint.

19. The non-transitory computer-readable medium of claim 14, wherein the checkpointing of the state of the one or more guest OS's permits that any guest OS is rolled back to its last checkpointed state, independently of all other guest OS's running on a same computer system.

20. The non-transitory computer-readable medium of claim 14, wherein the operations further comprise checkpointing and rolling back the hypervisor, while still providing the option of rolling back the one or more guest OS's individually.

21. A computer system configured to run a hypervisor operable to enable a state of one or more guest operating systems to be checkpointed comprising: a processor;
a first system configured to use a temporary-read-only bit to convert a pseudo-physical address of a hypervisor's guest operating system (OS) to a physical address, and further configured to co-employ the temporary-read-only bit and another read-only bit toward a result that normal read-only page violations and violations for checkpointing are distinguishable by the hypervisor; and
a second system configured to checkpoint the state of one or more guest OS's of the hypervisor.

22. The system of claim 21, further comprising a third system configured to maintain input/output (I/O) read-and write-buffers in the hypervisor's virtual space, whose contents are preserved until the guest OS is checkpointed following completion of an I/O operation;
wherein the input/output (I/O) read-and write-buffers maintained in the hypervisor's virtual space are used for all I/O operations, and wherein preserving the contents until the guest OS is checkpointed following the completion of the I/O operation enables I/O operations to continue uninterrupted using standard, unmodified I/O drivers.

23. The system of claim 22, wherein the third system is configured to manage three lists of input/output (I/O) request blocks for the guest OS comprising:
a list of those requests that have been made by the guest OS but have not yet been completed;
a list of those requests that have been completed since the guest OS was last checkpointed; and
a list of those requests that were acknowledged to the guest OS as having been completed at the time of its last checkpoint.

24. The system of claim 21, wherein the second system is so configured that any guest OS is rolled back to its last checkpointed state, independently of all other guest OS's running on the same computer system.

25. The system of claim 21, wherein the second system is so configured that ongoing I/O operations are not interrupted in the event of a fault and need not be repeated following any rollback.

26. The system of claim 21, in which the hypervisor itself is checkpointed and rolled back, while still providing the option of rolling back the one or more guest OS's individually.

27. A method comprising:
using a temporary-read-only bit to convert a pseudo-physical address of a hypervisor's guest operating system (OS) to a physical address;

co-employing the temporary-read-only bit and another read-only bit toward a result that normal read-only page violations and violations for checkpointing are distinguishable by the hypervisor; and checkpointing a state of one or more guest OS's of the hypervisor.

28. The method of claim 27, further comprising:

maintaining input/output (I/O) read-and write-buffers in the hypervisor's virtual space, whose contents are preserved until the guest OS is checkpointed following completion of an I/O operation; and preserving the contents until the guest OS is checkpointed following completion of the I/O operation.

29. The method of claim 28, wherein the maintaining of the I/O read-and write-buffers includes managing three lists of input/output (I/O) request blocks for the guest OS, the lists comprising:

a list of those requests that have been made by the guest OS but have not yet been completed;

a list of those requests that have been completed since the guest OS was last checkpointed; and a list of those requests that were acknowledged to the guest OS as having been completed at the time of its last checkpoint.

30. The method of claim 27, wherein the checkpointing of the state of the one or more guest OS's permits that any guest OS is rolled back to its last checkpointed state, independently of all other guest OS's running on a same computer system.

31. The method of claim 27, further comprising checkpointing and rolling back the hypervisor, while still providing the option of rolling back the one or more guest OS's individually.

32. A non-transitory computer-readable medium having computer-executable instructions stored thereon that, if executed by a computing device, cause the computing device to perform operations comprising:

using a temporary-read-only bit to convert a pseudo-physical address of a hypervisor's guest operating system (OS) to a physical address;

co-employing the temporary-read-only bit and another read-only bit toward a result that normal read-only page violations and violations for checkpointing are distinguishable by the hypervisor; and checkpointing a state of one or more guest OS's of the hypervisor.

33. The non-transitory computer-readable medium of claim 32, wherein the operations further comprise:

maintaining input/output (I/O) read-and write-buffers in the hypervisor's virtual space, whose contents are preserved until the guest OS is checkpointed following completion of an I/O operation; and preserving the contents until the guest OS is checkpointed following completion of the I/O operation.

34. The non-transitory computer-readable medium of claim 33, wherein the operations further comprise continuing I/O operations uninterrupted using standard, unmodified I/O drivers.

35. The non-transitory computer-readable medium of claim 33, wherein the maintaining of the I/O read-and write-buffers includes managing three lists of input/output (I/O) request blocks for the guest OS, the lists comprising:

a list of those requests that have been made by the guest OS but have not yet been completed;

a list of those requests that have been completed since the guest OS was last checkpointed; and a list of those requests that were acknowledged to the guest OS as having been completed at the time of its last checkpoint.

36. The non-transitory computer-readable medium of claim 32, wherein the checkpointing of the state of the one or more guest OS's permits that any guest OS is rolled back to its last checkpointed state, independently of all other guest OS's running on a same computer system.

37. The non-transitory computer-readable medium of claim 32, wherein the operations further comprise checkpointing and rolling back the hypervisor, while still providing the option of rolling back the one or more guest OS's individually.

* * * * *